Patented May 15, 1934

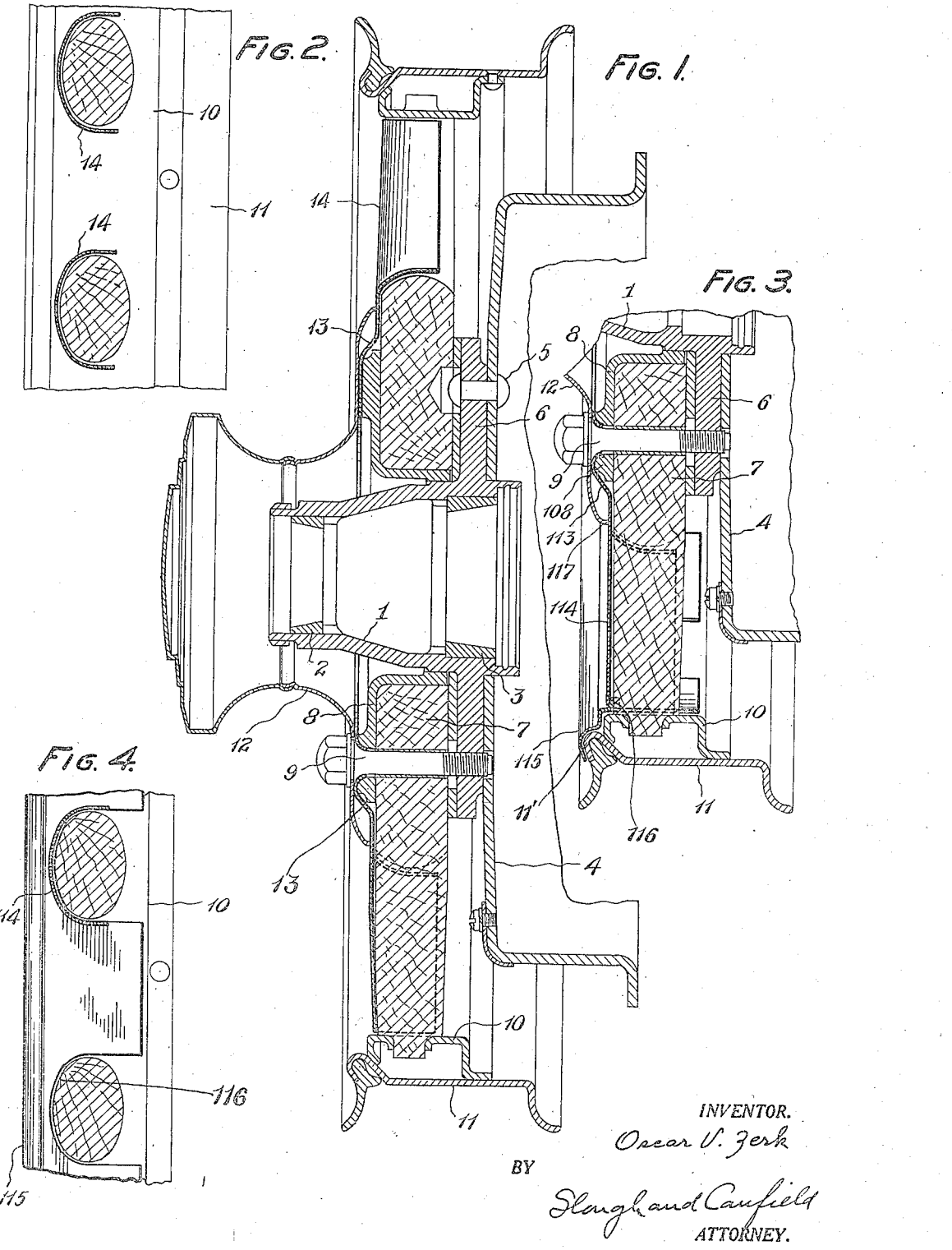

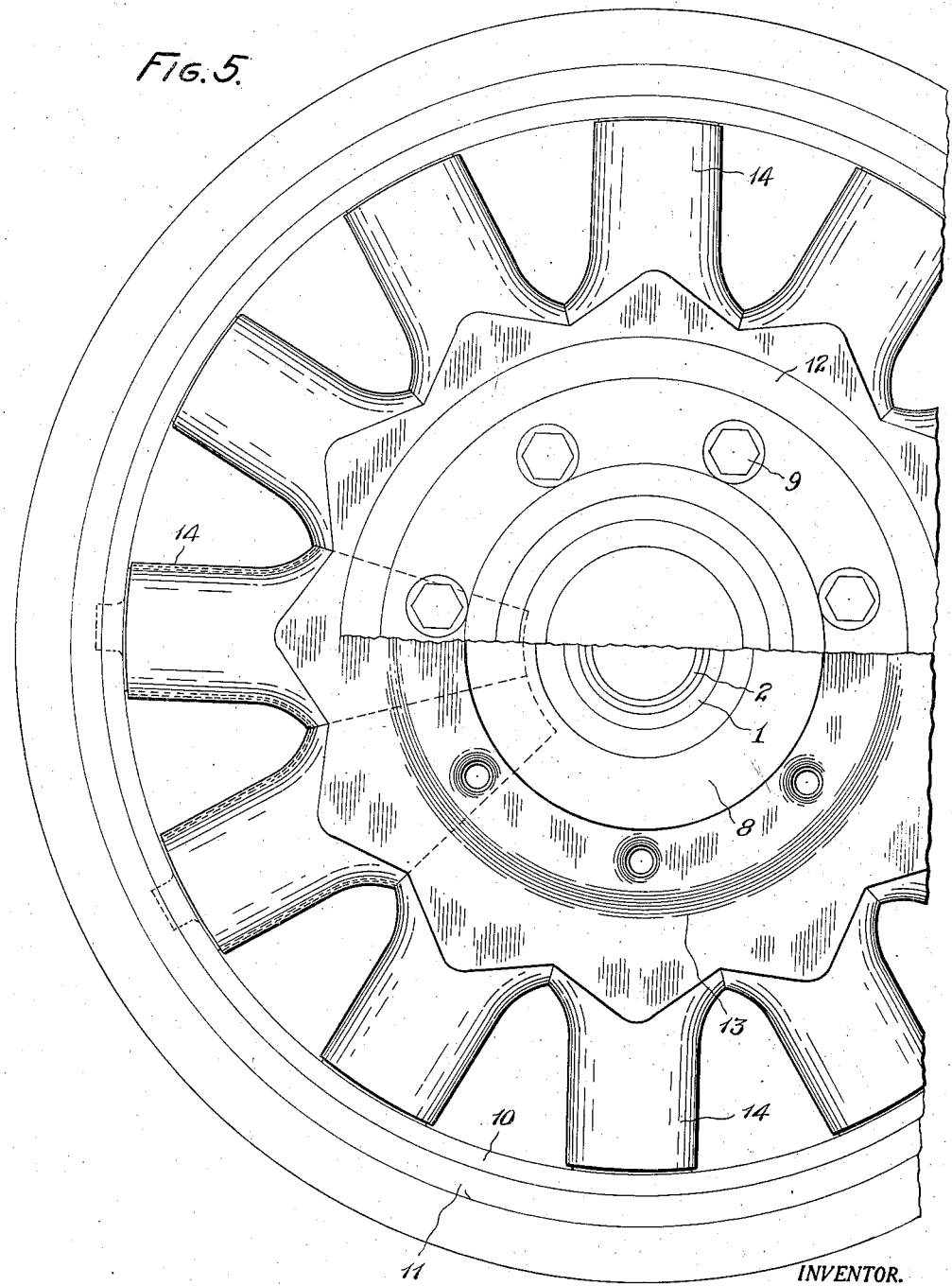

UNITED STATES PATENT OFFICE 1,959,255

WHEEL SPOKE COVER

Oscar U. Zerk, Cleveland, Ohio

Application May 27, 1931, Serial No. 540,307

11 Claims. (Cl. 301—37)

My invention relates to metallic covers for wheel spokes, and while particularly adaptable to the cover of wood wheel spokes, it is susceptible to use in connection with most other types of wheels employing spokes of any kind.

The spokes of wooden wheels are exposed to the weather, especially rain, with the result that wooden spokes sometimes get loose, thus losing their rigidity; when wooden spokes are protected by various coats of paint, the rubbing down of these coats to give the spokes a smooth appearance is very expensive, and wooden spokes which are just varnished show the natural color of the wood, which does not harmonize with the other parts of the car where the paint or Duco finish represents covered metal.

Two types of wooden wheels are used for automobiles, those wherein the entire wheel is demountable from the vehicle axle by detaching the hub of the wheel therefrom, and those wherein a tire change is adapted to be made by removing merely the tire rim with the attached tire from the wheel which remains securely in place on the vehicle axle.

In the demountable at the hub type the fastening screws are situated near the center of the wheel while in the wheel demountable at the rim they are situated near the periphery of the wheel. In some of the first type wheels these screws are covered by a large diameter hub cap while in other of the first type and most all of the latter type wheels the fastening screws and nuts are visible.

Inasmuch as certain portions of the mechanical structure of a wheel are of an unpleasing appearance, or later become unpresentable through use and wear, a principal object of my invention is to cover the less presentable parts of an automotive wheel having the least æsthetic appeal by a highly polished cover, preferably stamped of stainless steel, or of ordinary steel or brass, preferably plated with nickel or chromium, or coated in any other suitable manner to effect a pleasing appearance.

Another object of my invention is in certain embodiments of my invention to cover the centrally located wheel assembly bolts situated around the hub cap with the same preferably sheet metal cover which covers the spokes and/or the spokes and rim.

Another object of my invention is to provide an improved cover preferably of the above type for the spokes of an automotive vehicle applied and maintained in place in an improved manner.

Another object of my invention is to provide an improved integral cover for all of the spokes of an automotive wheel which is readily attachable and detachable as a unit.

Another object of my invention is to provide a unitary cover for all of the spokes of an automotive wheel.

Another object of my invention is to provide a unitary cover for the spokes of an automotive wheel which by its inherent resiliency will not be susceptible to such vibrational effects as will create an unpleasant "rattle" by intermittent contact with any part of the wheel.

Another object of my invention is to provide an inherently resilient normally stressed cover making pressure engagement with the parts of a wheel while secured thereto to subdue noise creating vibrations thereof thereagainst.

Another object of my invention is to provide a unitary cover for a plurality of spokes of an automotive vehicle wheel which will be unlikely to entrap water between the opposed spoke and cover surfaces, but which on the contrary will permit the free egress of water therefrom by centrifugal force while the vehicle is in operation, or by gravity when the vehicle is at a standstill.

Another object of my invention is to provide separate improved cover means applied and maintained in place in an improved manner in units applicable to less than the total number of spokes of an automotive vehicle.

Another object of my invention is to provide individual and preferably detachably connected spoke covers for individual spokes.

Other objects of my invention reside in the provision of variant means as hereinafter set forth, for covering the generally unsightly parts of an automotive vehicle wheel, or the like, in an improved manner.

The present application is a companion application to my application, Serial No. 540,306, filed May 27, 1931, and in which application wheel cover structures are disclosed which are characterized by being detachably secured in place on the wheel by means of the wheel hub cap.

In the present application, the wheel cover elements in the different embodiments, are secured to the wheel by means independent of the hub caps, such as the securing bolts for the other wheel parts, such as the spokes and the like.

The following drawings forming a part of this specification illustrate various embodiments of my invention described in the accompanying specification.

In the drawings:—

Fig. 1 is a view in diametrical section of a spoked wheel and cover applied thereto, which is a first embodiment of my invention;

Fig. 2 is a transverse section through two adjacent spokes of the wheel of the said first embodiment, showing a portion of the cover means therefor in position;

Fig. 3 is a diametrical section of a wheel with separate cooperating spoke and rim covers applied thereto, which is a second embodiment of my invention;

Fig. 4 is a transverse section through a pair of adjacent spokes and spoke embracing cover means of the wheel of Fig. 3;

Fig. 5 is a view in side elevation of the wheel and cover therefor of the said second embodiment;

Referring now generally to my invention and to the embodiments thereof illustrated in the different figures of the drawings above enumerated, said embodiments are characterized by providing a covering which is secured through the wheel by screws or bolts passing through the covering and threaded into some portions of the wheel itself, that fall into the following classes.

First, a unitary spoke covering comprising a centrally perforated portion with a reception of the wheel hub proper and which is clamped to the wheel hub by means of the screws customarily provided in holding the hub parts together and substantially channel-shaped spoke-embracing portions formed integrally with said central portion and extending radially therefrom.

Second, a unitary spoke cover similar to that above described but in addition having an annular rim covering portion formed integrally with the outer end of a spoke covering portion thereof.

Third, a series of separately formed individual spoke covers each provided with a flattened central portion overlying a portion of the hub part of the wheel and together comprising the covering.

Fourth, a continuous disc-like cover adapted to overlie the entire outer surface of the wheel including at least a portion of the rim thereof, and Fifth, a unitary spoke cover similar in general to the second group above described but secured to a wheel by means of the bolts which ordinarily are provided for retaining the demountable rim in place.

Referring first to the embodiment of the invention illustrated in Figs. 1, 2 and 5, the invention is shown as applied to a more or less conventional type of artillery wheel.

The wheel has a central hub 1 supported upon anti-friction bearings 2 and 3 which are carried by the vehicle axle. Secured to this hub on its inner side is a brake drum 4, the drum being attached as by rivets 5 through an outwardly extending flange 6 formed integrally with the hub. On the outer side of the flange 6 are a series of radially disposed wooden spokes 7 which are clamped against the flange by means of a retaining ring 8 and screws 9. The outer ends of the spokes are reduced and extend through apertures in the felloe 10 of the wheel, and upon the outer periphery of the felloe the tire-retaining rim 11 is secured in any well known or desired manner.

A hub cap 12 covers the outer end of the hub assembly, being secured to ring 8 by the screws 9. The parts above described are those found in the ordinary wheel of the type to which the cover is adapted to be applied, and will be referred to by the same reference characters in the figures showing other embodiments of the invention.

The wheel cover shown in Figs. 1, 2 and 5 consists preferably of a sheet metal stamping having a central, outwardly dished perforated portion 13, the central part of which is substantially flat and adapted to fit snugly against the outer surface of the hub-ring 8, and a plurality of radially disposed channel-shaped extensions 14 integral with central portion, these portions being the spoke covers and completely overlying the front surfaces of the spokes and extending nearly to the rear edges thereof.

The central annular portion 13 of the spoked cover is preferably offset outwardly from the spoke cover portions 114 and is perforated at intervals to receive the bolts 9 with the portions of the stampings surrounding the perforations pressed inwardly so as to form a socket seat for the suitably formed neck portion of the bolt 9, whereby the spoke cover is rigidly secured by said bolt intermediate said neck and a seat formed by the outwardly flaring mouth of the bolt holes in the hub ring 8.

The spoke covering portions are disposed in such a manner that when the parts are in unstressed condition, they will contact the outer surfaces of the spokes near their ends before the central portion is in contact with the ring 8, so that when the central portion is drawn into contact with the ring, they will be slightly distorted and, through the resiliency of the metal of which they are formed, will bear upon the spokes with sufficient pressure to prevent looseness or rattling. At all other points than that of contact, the outer surfaces of the spokes, the covers are slightly spaced apart to permit the egress of water, either under the influence of centrifugal force when the wheel is in motion, or by gravity when the vehicle is standing still. The central portion of the cover is positioned as illustrated in Fig. 1 between the usual hub cap 12 and ring 8 so that the edge of the hub cap is clamped tightly upon its outer surface and the entrance of dirt to the interior of the housing is prevented.

The outer exposed surface of the sheet metal covering is preferably of polished metal as stainless steel or any desired metal plating, for instance chromium or nickel. The surfaces may, however, if desired, be finished in enamel, lacquer or any other desired coating material which may be plain, grained to imitate wood or the like, striped, or ornamented in any manner dictated by the taste of the producer.

Referring now to the embodiment of the invention shown in Figs. 3 and 4, a wheel substantially identical to that described in connection with the first embodiment is illustrated, and a cover is shown consisting of a central annular portion 113 and a substantially channel-shaped spoke cover 114, these parts being similar to those above described.

In addition, the tire rim gutter 11' is covered by an annular sheet metal cover 115 with an outer surface finished like the spoke cover and is provided with a plurality of inwardly extending arcuately bowed flanges 116, each of which is adapted to be slipped under an end portion of a different spoke cover 114. In this embodiment the hub cover cap 12 by a downturned peripheral edge 117 bears against the spoke cover 114 to cause its said end to resiliently press against said flange 116 so as to tightly hold the rim cover 115 in place.

This cover does not actually contact any portion of the spokes, but preferably provides a clear space surrounding the spokes throughout their entire extent, and the cover upon being clamped to the ring by the hub cap and screws 9, the rim covering portion will press upon the rim with sufficient force to prevent rattling.

In each of the above described embodiments of the invention, sufficient space is provided between the covers and the spokes and other parts of the wheel to permit water and the like to find its way out, expulsion being aided by centrifugal force when this is present and by gravity when it is absent. The result of the use of any of the above described covers is to give the wheel a highly finished artistic appearance either as though it were made of a single piece of polished metal or of some other material harmonizing with the body finish. Rim-attaching lugs, parts of the rims themselves and spokes, felloes, and portions of the hub may all be concealed, and although a few nuts or screw heads may be visible, the general effect is to minimize the impression of numbers of mechanical parts such as is conveyed to the eye by ordinary types of vehicle wheels.

From the above it will be seen that I have provided a novel, simple, silent and attractive attachment for vehicle wheels and that the same is susceptible to considerable modifications and variations, and I therefore do not limit myself to the embodiments shown and described, but claim as my invention all embodiments coming within the appended claims.

I claim:

1. The combination with an artillery type wheel, comprising a hub, spokes secured thereto and radiating therefrom, an annular tire support carried at the outer ends of said spokes, bolts securing said spokes to the hub, and an outwardly extending substantially cup-shaped cover having a generally outwardly extending rim flange also secured to said hub by said bolts, of a series of tubular sheet metal channel elements placed over the outer surface of each of the different spokes, said spoke cover elements being rigidly affixed to said hub by said bolts, and an annular cover for said tire support comprising radially inwardly extending axially inwardly off-set flange means engageable with the wheel spokes and interposed between outer portions of the spoke cover elements and said spokes.

2. The combination with an artillery type wheel, comprising a hub, spokes secured thereto and radiating therefrom, an annular tire support carried at the outer ends of the spokes, of a series of sheet metal channel elements placed over the outer surface of each of the different spokes, and an annular cover for said tire support comprising a radially inwardly extending flange portion interposed between a radially outer portion of a spoke cover element and the corresponding spoke.

3. The combination with an artillery type wheel, comprising a hub, spokes secured thereto and radiating therefrom, an annular tire support carried at the outer ends of said spokes, bolts securing said spokes to the hub, of a series of sheet metal channel elements placed over the outer surface of each of the different spokes, the spoke cover elements being rigidly secured to the hub by said bolts, and an annular cover for said tire support comprising a radially inwardly extending flange portion disposed between a radially outer portion of a spoke cover element and the corresponding spoke.

4. The combination with an artillery type wheel, comprising a hub, spokes secured thereto and radiating therefrom, an annular tire support carried at the outer ends of the spokes of a series of sheet metal channel elements placed over the outer surface of each of the different spokes and an annular cover for said tire support comprising a plurality of radially inwardly extending flanges interposed between radially outer portions of the spoke cover elements and said spokes.

5. The combination with an artillery type wheel, comprising a hub, spokes secured thereto and radiating therefrom, an annular tire support carried at the outer ends of said spokes, bolts securing said spokes to the hub, of a series of sheet metal channel elements placed over the outer surface of each of the different spokes, the spoke cover elements being rigidly secured to the hub by said bolts, and an annular cover for said tire support comprising a plurality of radially inwardly extending flange portions disposed between radially outer portions of the spoke cover elements and said spokes.

6. The combination with an artillery type wheel comprising a hub, spokes, and a felloe of a sheet metal cover for the wheel comprising an annular cover portion covering axially outer portions of the felloe and having projections extending axially inwardly between adjacent spokes and covering radially inner portions of the felloe.

7. The combination with an artillery type wheel comprising a hub, spokes, a felloe and a tire rim, of a sheet metal cover for the wheel comprising an annular rim cover portion having projections extending axially inwardly between adjacent spokes and covering radially inner portions of the felloe.

8. The combination with an artillery type wheel comprising a hub, spokes, and a felloe of a sheet metal cover for the wheel comprising radially extending channeled spoke covering portions, an annular felloe covering portion covering axially outer portions of the felloe and having projections extending axially inwardly between adjacent spokes and covering radially inner portions of the felloe, the felloe covering portions being held upon the corresponding covered wheel portions by engagement with radially outer end portions of the spoke covering portions.

9. The combination with an artillery type wheel comprising a hub, spokes, a felloe and a tire rim, of a sheet metal cover for the wheel comprising radially extending channeled spoke covering portions and an annular cover portion covering portions of the rim and having projections extending axially inwardly between adjacent spokes and covering radially inner portions of the felloe, the annular portion being held upon the corresponding covered wheel portions by engagement with radially outer end portions of the spoke covering portions.

10. The combination with an artillery wheel comprising a hub, spokes, and a peripheral tire support portion, of a sheet metal cover for the wheel comprising an annular cover portion covering axially outer portions of the tire supporting portion and having projections extending axially inwardly between adjacent spokes and covering radially inner portions of the tire supporting portion.

11. The combination with an artillery wheel comprising a hub, spokes, and an annular tire supporting portion, of a sheet metal cover for the wheel comprising radially extending channeled spoke covering portions, an annular covering portion for the tire supporting portion covering axially outer portions thereof and having projections extending axially inwardly between adjacent spokes and covering radially inner portions of the tire supporting portion, the portions of the cover covering the tire supporting portion of the wheel being held upon the corresponding covered wheel portion by engagement with radially outer end portions of the spoke covering portions.

OSCAR U. ZERK.